United States Patent [19]

Reynolds et al.

[11] 4,288,414

[45] * Sep. 8, 1981

[54] PROCESS FOR CHLORINATING CLAYS AND BAUXITE

[75] Inventors: James E. Reynolds, Golden; Alan R. Williams, Denver, both of Colo.

[73] Assignee: Public Service Company of New Mexico, Albuquerque, N. Mex.

[*] Notice: The portion of the term of this patent subsequent to Jun. 26, 1996, has been disclaimed.

[21] Appl. No.: 50,549

[22] Filed: Jun. 20, 1979

Related U.S. Application Data

[63] Continuation-in-part of Ser. No. 873,400, Jan. 30, 1978, Pat. No. 4,159,310.

[51] Int. Cl.$^3$ .................. C01G 23/02; C01F 7/56; C01G 49/10; C01B 33/08

[52] U.S. Cl. .................. 423/79; 423/76; 423/135; 423/136; 423/149; 423/343; 423/155; 423/166; 423/481

[58] Field of Search .................. 423/76–79, 423/135, 136, 149, 343; 75/112

[56] References Cited

U.S. PATENT DOCUMENTS

| | | | |
|---|---|---|---|
| 1,147,832 | 7/1915 | Kugetgen et al. | 423/136 |
| 1,600,216 | 9/1926 | Dearborn | 423/136 |
| 1,605,098 | 11/1926 | Dearborn | 423/136 |
| 1,866,731 | 7/1932 | Starb | 423/136 |
| 1,875,105 | 8/1932 | Muggleton et al. | 423/136 |
| 1,891,608 | 12/1932 | Scheidt | 423/131 |
| 3,244,509 | 4/1966 | Nowak et al. | 75/29 |
| 3,466,169 | 9/1969 | Nowak et al. | 423/136 |

Primary Examiner—Herbert T. Carter
Attorney, Agent, or Firm—Sheridan, Ross, Fields & McIntosh

[57] ABSTRACT

A process for recovering aluminum from clays associated with coal or bauxite containing iron, siliceous material and titanium which comprises: (a) chlorinating the clay or bauxite in an oxidizing atmosphere to selectively chlorinate and vaporize iron chloride from the remaining chlorides, (b) chlorinating the residue from step (a) in a reducing atmosphere or carbon monoxide and vaporizing the chlorides of aluminum, silicon, titanium, and the residual iron, (c) separating and recovering the formed vaporized chlorides by selective condensation. Silicon tetrachloride may be added to step (b) to suppress the chlorination of silicon. If the clay contains alkali or alkaline earth metals, then the residue of step (b) is treated with sulfuric acid to convert the soluble chlorides, e.g., gypsum, to sulfates and to regenerate a chloridizing and binder solution for pelletizing the clay or bauxite.

15 Claims, 1 Drawing Figure

PROCESS FOR CHLORINATING CLAYS AND BAUXITE

DESCRIPTION

Cross Related Patent Application

This application is a continuation-in-part application of Ser. No. 873,400 filed Jan. 30, 1978, now U.S. Pat. No. 4,159,310.

TECHNICAL FIELD

The process of the invention relates to a two stage chlorination of clays associated with coal and bauxite for the recovery of aluminum of substantially high purity.

BACKGROUND ART

Prior Art Statement

Several processes have been taught for the chlorination of bauxite and aluminum bearing clay. Dearborn in U.S. Pat. No. 1,605,098 and U.S. Pat. No. 1,600,216 teaches a two stage chlorination of bauxite and aluminum bearing clays. Both chlorination steps are done in the presence of a reducing agent and chlorine. Muggleton et al in U.S. Pat. No. 1,875,105 discloses chlorinating clays in the presence of carbon monoxide and chlorine at a temperature of 600°–900° C. to chlorinate the aluminum, iron and titanium. Thereafter, the residue is treated with carbon, chlorine and heat to chlorinate the silica and aluminum silicates contained in the clay. Staib in U.S. Pat. No. 1,866,731 discloses treating raw material containing aluminum and silicic acid with a carbonaceous material and equal parts of chlorine and silicon tetrachloride in order to chlorinate the aluminum and not the silica contained in the material. Nowak et al in U.S. Pat. No. 3,244,509 utilizes a reductive chlorination followed by an oxidative chlorination, both performed at 800°–1200° C., to extract iron from iron oxide bearing materials. Chlorine need not be present for either chlorination step and carbon is the preferred reducing agent for the reductive chlorination step. Nowak in U.S. Pat. No. 3,466,169 chlorinates ores in a reducing-oxidizing atmosphere while regulating the amount of added chlorine to correspond stoichiometrically to the metal having the greatest chloride-forming affinity.

With the exception of leaching processes, none of the prior art teaches a satisfactory process for economically recovering aluminum from clays associated with coals or from bauxite having the required purity for commercial sale because of the difficulty of separating the aluminum from other metals present in these materials, particularly, iron. Separation through the chlorination route to recover aluminum as aluminum chloride looks attractive; however, the process must produce an aluminum chloride of substantial purity. For example, purity requirements for aluminum chloride feed material to an Alcoa-type aluminum cell are reported to limit the $Fe_2O_3$ content of the feed to 0.03 percent. Furthermore, in the chlorination process, the chlorination of unwanted metals, such as silicon, must be suppressed to restrict the consumption of chlorine; otherwise, the process becomes prohibitively expensive.

A further problem involved in recovering the metal values from clays through the chlorination route, is the disposal of alkali and alkaline earth metal chlorides remaining in the final residue.

Accordingly, it is a principal object of this invention to provide a method for recovering aluminum of substantially high purity from bauxite and clays associated with coal which contain iron and siliceous material with the aluminum.

It is another object of this invention to provide a method for suppressing the chlorination of siliceous material when recovering aluminum as aluminum chloride from clays and bauxite by chlorination.

It is a further object of this invention to provide a method for the disposal of alkali and alkaline earth metal chlorides remaining in the final residue resulting from the chlorination of clays to recover aluminum as aluminum chloride.

DISCLOSURE OF THE INVENTION

A process for recovering aluminum from clays associated with coal or bauxite containing iron and siliceous material by the chlorination route which comprises first separating iron in an oxidizing atmosphere and vaporizing it, followed by chlorinating the residue containing the remaining metals including aluminum, silicon, silica, titanium, alkali and alkaline earth metals, and some iron, in a reducing atmosphere of carbon monoxide in the absence of solid carbon to suppress the chlorination of the siliceous material, vaporizing the chlorides of aluminum, silicon, titanium and the remaining iron, separating and recovering the vaporized chlorides by selective condensation, and treating the final residue, if it contains soluble chlorides, with sulfuric acid to convert calcium chloride to disposable gypsum with simultaneous regeneration of a dilute hydrochloric acid solution for purposes of prechloridizing the feed and also providing a suitable binder for pelletizing the feed.

Improvements are forming the feed material into carbon-free briquettes, and introducing silicon chloride into the reductive chlorination step to further suppress the chlorination of siliceous materials contained in the feed.

BEST MODE FOR CARRYING OUT THE INVENTION

Figure 1:
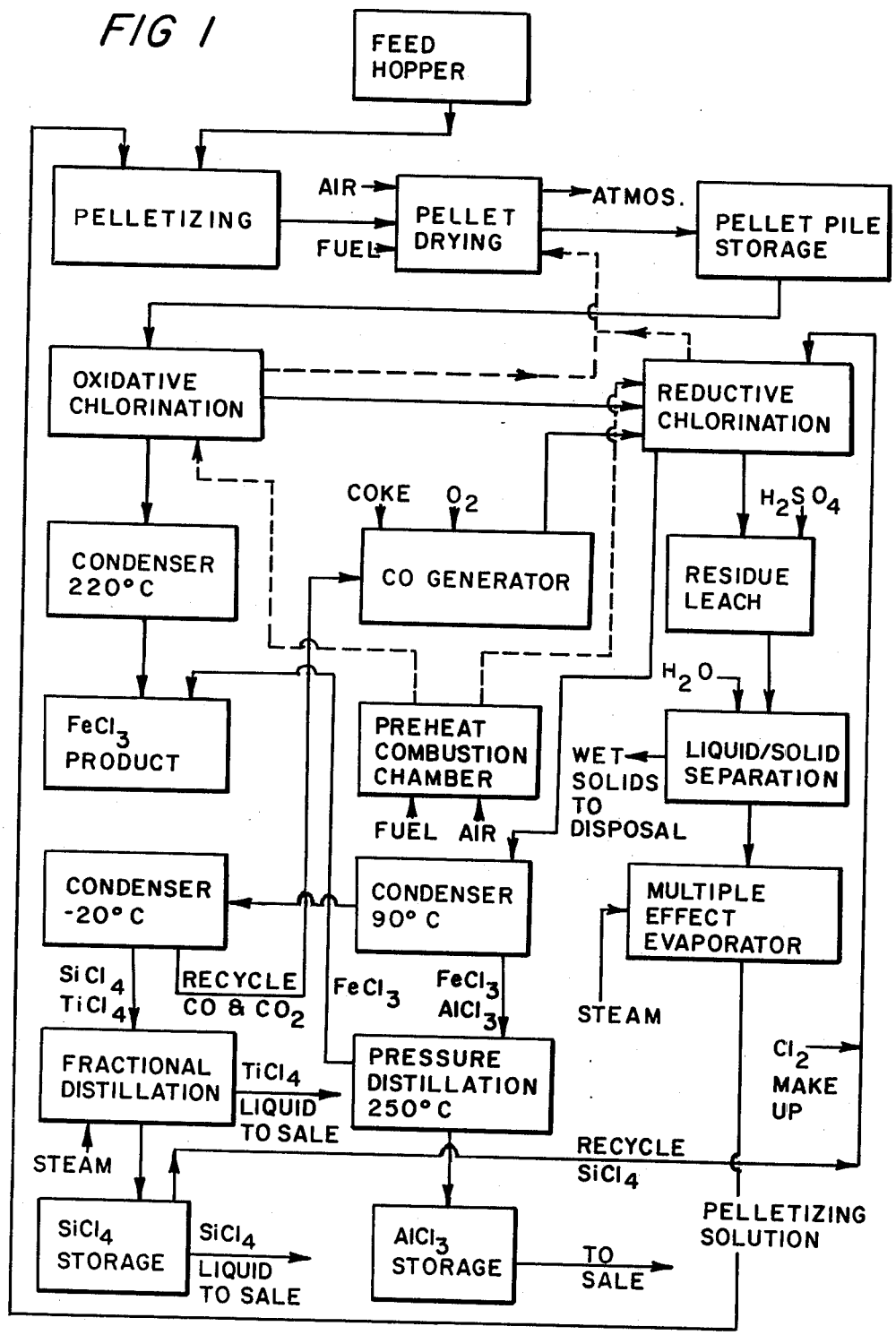
FIG. 1 is flow sheet of the complete process of the invention.

The process of the present invention is applicable to bauxite and clays associated with coals. Clays are generally fine-grained, earthy material made up of minerals which are essentially hydrous aluminum silicates. The specific mineral content of the clay depends upon the area in which the clay is found. The clays on which the present process is operable are ones found associated with coal, for example, parting clays which are found between seams of coal. Additional examples include top and bottom contact clays, which are found at the top and bottom, respectively, of the coal reserve, clays in the overburden of the coal and clays found in coal refuse, i.e., the washings of coal to remove ash minerals from the coal.

The invention will now be described with reference to FIG. 1. First, the clay or bauxite undergoes a pelletizing step wherein a hydrochloric acid binder solution is added and it is pelletized into high-density, high strength pellets in conventional equipment such as an extrusion type pelletizer. Following pelletizing, the pellets are dried at about 300° C. in a direct fired dryer. Dry pellets are inventoried for feed to the shaft chlorinator or furnace. The clay or bauxite may be ground before pelletizing; however, this does not affect the recovery of the metal values. Pelletizing is mandatory for a shaft reactor. Sequential chlorination techniques are amenable to the plug-flow nature of the shaft chlorinator.

Shaft chlorinations require a high-crush, strong pellet feed which does not lose strength during chlorination. Pelletization of clay or bauxite without any binder produces a weak pellet when sintered at 300° C. Thus, various binders were tested for the pellets, for example, sulfuric acid, hydrochloric acid, and sodium chloride. Bentonite was tested to see if the hot strength of the pellets could be improved. The latter produces a stronger pellet if the sintering is done at 1000° C.

Carbon-containing pellets are not satisfactory because they lose most of their strength during chlorination while carbon-free pellets appear to maintain their integrity throughout the chlorination and the residue pellets are about as strong as feed pellets. Solid carbon is not satisfactory as a reducing agent for the reductive chlorination. Extrusion or compaction-type pelletizers are the most satisfactory for low-density feed materials. Pellets bound with hydrochloric acid are the most satisfactory although sulfuric acid is a suitable binding agent. As is shown in the flow sheet of FIG. 1, liquid from the sulfuric acid treatment of the final residue is recycled to the pelletizing step and this liquid containing hydrochloric acid and some small amounts of metal chlorides is a satisfactory binder for the pellets.

The pellets are dried with fuel-air or by recuperation of heat from high temperature gases exiting the oxidation chlorinator and stored pursuant to chlorination.

As is seen from the flow sheet of FIG. 1, the oxidative chlorination step comes next followed by reductive chlorination. The most effective procedure is to first remove the iron by selective chlorination in an oxidative chlorination step followed by volatilization of the formed ferric chloride and its recovery by condensation. Up to 98 percent of the iron is volatizied with substantially no chlorination or volatilization of the other metal values. It is important, of course, that substantially no aluminum chloride be formed or volatilized at this stage. As one of the big economic factors involved with the process is the use of chlorine, it is also important to suppress the chlorination of the other metal values, particularly siliceous materials, as the clays can contain over 25 percent silica and bauxite can contain up to 25 percent silica.

The degree of chlorination in the reductive chlorination step can be greatly reduced by using only carbon monoxide as a reducing agent rather than a carbonaceous material such as fuel oil or coke. The injection of silicon tetrachloride into the reaction gas mixture of chlorine and carbon is effective in reducing the amount of chlorination of siliceous material contained in bauxite, refuse coal and clays associated with coal.

The overall chlorination procedure results in chlorination of alkali and alkaline earth metals present. Suppression of the chlorination of these elements which end up in the final residue as chlorides is not emphasized because a feasible way of disposing of the chlorides in the residue is known. However, the best reaction condition for minimizing chlorination of sodium and magnesium is the absence of carbon during the chlorination.

The oxidative chlorination for the selective removal of iron is preferably performed on clays or bauxite pellets with a hydrochloric acid binder in a shaft chlorinator. Attempts to remove iron from the pellets by chlorination under reducing or neutral conditions are not feasible because of cochlorination of excessive amounts of alumina.

A number of shaft furnace chlorinators used as batch chlorinators is one method of operation. These chlorinators are operated with staggered sequence of operation designed for optimum heat recuperation. For the oxidation chlorination, the charge is brought up to the proper temperature with hot, neutral combustion gases from a coal-fired furnace. A mixture of chlorine and oxygen gases is then circulated for up to three hours through the charge to oxidatively chlorinate and volatilize about 90 to 95 percent of iron content. The oxygen is employed in an amount of from about 20 percent to 60 percent and preferably from 30 percent to 50 percent by volume of the total gas composition. The chlorine is employed in an amount which is a small stoichiometric excess of that needed to chlorinate the iron. The oxidative chlorination is conducted at a temperature of 650° to 900° C. and preferably from 750° to 800° C. for a time period sufficient to allow for the chlorination of most of the iron present. Generally, the time period is from about 0.5 to about 2 hours. The volatilized ferric chloride is collected in cooled scraped condenser. The next step is the reductive chlorination.

Carbon monoxide gas is added to the chlorinator in an amount of from about 30 to about 70 percent and preferably from 40 to 60 percent by volume of the total gas composition. The chlorine is supplied in slight excess of the stoichiometric amount needed to chlorinate the aluminum present. The reaction with carbon monoxide is sufficiently exothermic to be self-heating. Generally, the temperature of the reductive chlorination step is from 600° to 850° C. and preferably from 650° to 750° C. The chlorinator is operated for about one to three hours to collect a small amount of residual iron chloride in the first stage condenser and a high purity aluminum chloride in the second stage condenser. From about 3 to 20 percent silicon tetrachloride by volume of the total gas composition may be injected during the reduction to suppress silica chlorination. A third-stage condenser collects the chlorides of titanium and silicon. The onstream chlorinator is then purged with ambient air to remove residual chlorine and cool the residue. The purged gas is routed to a chlorinator coming on line for heat up and to react with the residual chlorine and silicon chloride. A preferred method of introducing the silicon chloride is to run the chlorine through the liquid silicon chloride before it enters the reactor. The cooled depleted pellets are conveyed to the leach circuit where water soluble chlorides, if present, are removed and calcium chloride is precipitated as gypsum with sulfuric acid. The residue solids are filtered, washed and sent to the disposal, while the hydrochloric acid solution is evaporated as required for water balance control and recycled to the pelletization step for reuse as a pellet binder and prechloridizer.

In order to illustrate the objectives of the process, the reported purity requirements for aluminum chloride feed material to an Alcoa-type aluminum cell are reported in Table 1.

TABLE 1

| Element | % |
|---|---|
| Al | 99.426 |
| $SiO_2$ | 0.025 |
| $Fe_2O_3$ | 0.03 |

TABLE 1-continued

| Element | % |
| --- | --- |
| CaO | 0.06 |
| MgO | 0.002 |
| Na$_2$O | 0.40 |
| TiO$_2$ | 0.005 |
| K$_2$O | 0.005 |
| P$_2$O$_5$ | 0.005 |

Optimum chlorination conditions of temperature, reaction time, and level of silicon tetrachloride were established for the reducing chlorinator. A silicon tetrachloride concentration in the chlorinator feed gas of 5 to 15 percent by volume of the total gas composition and a temperature of from 650° to 750° C. for a time period of 3 hours reduced silica chlorination to less than 10 percent while still sustaining an alumina recovery of over 80 percent. Iron is controlled by selective oxidative chlorination and also by further purification of the off gas using fractional condensing at two temperature levels. Siliceous material, including silica, potentially a large consumer of chlorine, is almost completely rejected by use of carbon monoxide only as a reductant, that is, no solid carbonaceous additive, and by the injection of silicon tetrachloride in the feed gas. The residue treatment, which will be outlined below, provides a method for dealing with alkali metal and alkaline earth metals which may be present with clay.

The carbon monoxide used in the reductive chlorination step can be regenerated using a hot coke bed such as a Wellman-Galusha carbon monoxide generator. Oxygen is added to maintain coke bed temperature at 950° C. Oxygen is preferable to air to avoid nitrogen buildup in the recycle gas. Alternatively, the recycled gas can be used as fuel either in pellet drying or the chlorinator preheat zone before going to the carbon monoxide generator.

Chlorine utilization is related to the rate of gas flow, or space velocity, with respect to bed volume. The conditions obtained in the laboratory reactor are not indicative of those which would be determined in a pilot plant. The reaction rate appears to be proportional to bed temperature with a lesser dependence on chlorine-carbon monoxide ratio in the reaction gas. The preferred temperature range for the oxidative chlorination step is from about 700° C. to 900° C. and from about 650° C. to about 750° C. for the reductive chlorination step.

It is seen from the above description of the invention that reductive chlorination using only carbon monoxide, that is, no solid carbonaceous additives such as coal, coke, fuel oil, or pitch results in a large improvement in rejection of silica chlorination with no loss in alumina recovery. Eliminating solid carbonaceous materials as a reductant has other advantages, such as, permitting initial oxidative chlorination of the pellet charge, increasing the strength of the pellets charged to the chlorinator as there is no loss in pellet strength during the chlorination as there is when coke, pitch or other carboneous material is added. The combination of a quantity of silicon tetrachloride in the chlorination gas, for example, six percent combined with carbon monoxide, almost completely rejects silica chlorination with only a small loss in alumina recovery. Ordinarily, an oxidative chlorination followed by reductive chlorination would necessitate an intermediate addition of coke to the feed, which would be an expensive process step. Surprisingly, this was found not to be necessary in this process.

Chlorides of iron, aluminum, silica, and titanium leave the chlorinator along with unreacted carbon monoxide, chlorine and carbon dioxide, and with a small amount of particulate carryover. The volatilized chlorides are recovered by fractional condensation. Off-gases containing volatile chlorides are fractionally condensed at three temperature levels to produce an iron chloride product, and aluminum chloride fraction, and a liquid mixture of silicon tetrachloride and titanium tetrachloride. Ideally, FeCl$_3$, AlCl$_3$, SiCl$_4$ and TiCl$_4$ can be separated according to their relative volatilities in a series of cooled condensers with high boilers condensing first. Scraped condensers in two stages collect the crude FeCl$_3$ and AlCl$_3$ fractions. A third stage condenser is chilled with a refrigeration unit to condense SiCl$_4$ and TiCl$_4$. Staged condensing, whereby the volatile chlorides are successively removed is the best approach for selective recovery. Unreacted chlorine, carbon monoxide and carbon dioxide are recycled back to the chlorinator or a carbon monoxide regenerator.

Volatile chlorides are condensed in three states. In the first stage a 220° C. scraped air condenser is used to remove most of the ferric chloride. This product may be contaminated with cocondensed AlCl$_3$, but the final product is marketable as a coagulant in tertiary sewage treatment, for example. A second stage condenser operates at 90° C. with cooling water to condense all of the AlCl$_3$ meeting the purity requirements for commercial sale. A third stage condenser operates at −20° C. for near-complete removal of SiCl$_4$ and TiCl$_4$ from the gas stream before recycle. Liquid SiCl$_4$ and TiCl$_4$ are condensed and then separated by fractorial distillation.

Non-condensables from the third stage condenser consist of chlorine, carbon monoxide and carbon dioxide, and possibly some low-boiling trace chlorides. This gas can either be burned for its heating value, if the carbon monoxide content is high enough and if the residual chlorine is low, or it can be recycled back to the chlorinator. Carbon monoxide and carbon dioxide can be recycled to the carbon monoxide generator.

The preheat combustion chamber for preheating the shaft reactor for both oxidative chlorination and reductive chlorination is supplied with fuel and air for heating. As is seen from the flow sheet, excess heat from the chlorination steps is sent to the pellet drying step. The utilization of all excess heat in the process contributes to the process' economic feasibility.

The low-iron, AlCl$_3$ product may be further purified by pressure distillation. The chlorides of silicon and titanium can be separated with high purity by fractional distillation. The silicon tetrachloride can be recycled to the chlorinator to act as a chlorinating agent and suppress chlorination of more silica, packaged as a saleable liquid, or burned with oxygen to produce silica fume which is a saleable product and thereby regenerating chlorine for recycle. Actually, the combined steps of oxidative chlorination of iron and fractional condensing of the AlCl$_3$ and FeCl$_3$ in the reducing chlorination may make an aluminum purification step unnecessary. Silica chlorination is reduced by the process to a level where all of the SiCl$_4$ produced can find a market.

As stated above, the chlorinations result in substantially all of the alkali metal and alkaline earth metals being almost completely chlorinated and these must be disposed of either by reuse or otherwise. Substantially all of the calcium chloride, which may be contained in clay, is converted to gypsum by treatment with sulfuric acid as shown in the flow sheet. The residue from the chlorination steps is leached with dilute sulfuric acid (possible from a $SO_2$ scrub-regeneration system on the power plant stack gas). This precipitates the calcium as gypsum, leaches out water soluble chlorides (and a small amount of acid soluble chlorides) to produce an inert refuse suitable for disposal to existing ash ponds. The leach solution contains dilute hydrochloric acid, sulfuric acid and a very small amount of alkali metal chloride. This solution is concentrated by evaporation and sent to the pelletizing step, as shown, to pelletize incoming feed clay. A further result of the treatment is to prechloridize the alkaline constituents of the clay, mostly calcium, and thereby reduce chlorine consumption by calcium remaining in the pellets. A weak hydrochloric acid solution is regenerated by the treatment of sulfuric acid with soluble calcium chloride to precipitate gypsum. The formed hydrochloric acid prechloridizes the chlorine consuming alkaline earth metals using, indirectly, inexpensive sulfuric acid, thereby reducing chlorine consumption in the process.

EXAMPLES

Analysis of the materials used in the examples set forth herein is presented in Table 2. Clay No. 6 is a parting clay from the Black Mesa coal mine in Arizona and Clay No. 8 is a bottom contact clay from the Black Mesa mine. The refuse clay of the examples was obtained from the washings of an Arizona coal from the same region.

TABLE 2

| Description | Al | Si | Fe | Na | K | Ca | Mg | C |
|---|---|---|---|---|---|---|---|---|
| Clay No. 6 | 14.7 | 24.2 | 1.46 | 0.111 | 0.65 | 1.04 | — | — |
| Clay No. 8 | 10.5 | 25.7 | 1.26 | 0.348 | 1.26 | 1.24 | 0.42 | — |
| Refuse | 10.8 | 20.7 | 2.61 | 2.26 | 1.14 | 0.12 | 0.38 | 4.36 |
| Arkansas Bauxite | 23.4 | 7.23 | 4.44 | — | — | — | — | — |

EXAMPLE 1

Oxidative chlorination was performed on a number of samples of clay and bauxite briquettes bound with hydrogen chloride binder. The parameters of the chlorination along with the results are presented in Table 3.

TABLE 3

Oxidizing Chlorinations of Clays

| Feed | Conditions | | | | | Sublimate | Calcine | | | | % Volatilization | | |
|---|---|---|---|---|---|---|---|---|---|---|---|---|---|
| | Weight gm | Temperature °C. | Time min | Cl₂ Flow cc/min | O₂ Flow cc/min | Weight gm | Weight gm | Assay Fe | Al | Si | Fe | Al | Si |
| Clay 6 | 30 | 700 | 30 | 150 | 50 | 1.99 | 23.9 | 0.40 | 15.5 | 30.1 | 78.1 | 16.1 | 1.0 |
| | 30 | 800 | 30 | 150 | 50 | 2.70 | 23.7 | 0.19 | 15.7 | 30.5 | 89.7 | 15.6 | 0.4 |
| | 30 | 950 | 30 | 150 | 50 | 3.23 | 23.2 | 0.086 | 12.0 | 30.8 | 95.4 | 37.0 | 1.6 |
| Clay 8 | 30 | 700 | 30 | 150 | 50 | 3.45 | 23.2 | 0.096 | 11.6 | 33.9 | 94.3 | 14.6 | 1.1 |
| | 30 | 700 | 30 | 100 | 100 | 1.87 | 23.6 | 0.15 | 12.3 | 33.2 | 91.0 | 7.9 | 1.4 |
| | 30 | 800 | 30 | 150 | 50 | 4.87 | 22.0 | 0.075 | 12.7 | 34.9 | 95.7 | 11.4 | 3.4 |
| | 30 | 800 | 30 | 100 | 100 | | (Not performed) | | | | | | |
| | 30 | 950 | 30 | 150 | 50 | 6.42 | 21.4 | 0.008 | 10.2 | 36.0 | 99.6 | 30.8 | 3.1 |
| Refuse | 30 | 750 | 0 | 100 | 100 | 1.2 | 24.4 | 0.84 | 14.02 | 28.52 | 73.8 | −5.6 | −12.1 |

EXAMPLE 2

A number of tests using the reductive chlorination procedure described above were preformed on different samples. Carbon monoxide was used as the sole reducing agent. It was introduced into the system as a mixture of chlorine and carbon monoxide. When silicon tetrachloride was added, it was added to the samples as a liquid after the chlorine had been bubbled through it. The parameters of the process and the results are presented in Table 4. Unless otherwise noted all of the samples were 30 gram charges.

TABLE 4

| Feed | SiCl₄ | Condition | | | | Product Weights | | Calcine Assay | | | % Volatilization | | |
|---|---|---|---|---|---|---|---|---|---|---|---|---|---|
| | | Temp °C. | Time hr | Cl₂ Flow cc/min | CO Flow cc/min | Sublimate | Calcine | Fe | Al | Si | Fe | Al | Si |
| Clay No. 8 | No | 650 | 1 | 220 | 100 | | (24.9)[1] | | 5.36 | 35.16 | | 57.6 | 13.6 |
| | | | 2 | | | | (19.9) | | 2.37 | 38.97 | | 85.0 | 0.6 |
| | | | 3 | | | 100 | 14.8 | 0.07 | 1.84 | 39.17 | 97.35 | 91.4 | 26.94 |
| Clay No. 8 | No | 750 | 1 | 220 | 100 | | (25.2) | | 2.38 | 38.41 | | 81.0 | 25.5 |
| | | | 2 | | | | (20.5) | | 1.22 | 39.89 | | 92.1 | 6.1 |
| | | | 3 | | | 11.0 | 15.7 | 0.07 | 0.67 | 39.40 | 97.2 | 96.7 | 22.04 |
| Clay No. 8 | No | 850 | 1 | 220 | 100 | | (25.4) | | 5.79 | 36.12 | | 53.3 | 19.0 |
| | | | 2 | | | | (20.8) | | 4.40 | 37.01 | | 70.9 | 0.2 |
| | | | 3 | | | 10.2 | 16.2 | 0.09 | 2.87 | 38.59 | 96.3 | 85.2 | 21.22 |
| Clay No. 8 | SiCl₄ 23 cc/min | 750 | 1 | 220 | 100 | | (25.6) | | 2.21 | 39.45 | | 82.0 | −31.0 |
| | | | 2 | | | | (21.3) | | 1.20 | 38.37 | | 91.9 | −6.0 |
| | | | 3 | | | 11.8 | 16.9 | 0.16 | 1.02 | 38.98 | 92.8 | 94.5 | 17.0 |
| Clay 8 | SiCl₄ 50.3 cc/min | 750 | 1 | 220 | 100 | | (25.9) | | 4.80 | 35.9 | | 60.5 | −20.6 |
| | | | 3 | | | 10.5 | 17.7 | 0.17 | 2.05 | 39.8 | 92.0 | 88.5 | 8.6 |
| Clay 8 dehy. | No | 750 | 1 | 220 | 100 | | (22.3) | | 11.3 | 31.9 | | 15.3 | 2.8 |
| | | | 2 | | | | (20.5) | | 9.97 | 31.5 | | 31.3 | 11.8 |
| | | | 3[2] | | | 4.0 | 18.9 | 0.29 | 9.96 | 31.3 | 80.1 | 36.7 | 19.2 |
| Clay 8 dehy. | SiCl₄ 27 cc/min (7.7%) | 750 | 1 | 220 | 100 | | (22.8) | | 12.6 | 33.0 | | 3.5 | 2.8 |
| | | | 3[2] | | | 1.7 | 20.3 | 0.34 | 11.2 | 32.0 | 75.0 | 23.6 | 11.3 |
| Refuse | No | 750 | 1 | 220 | 100 | | (24.7) | | 7.83 | 31.9 | | 40.3 | −26.9 |
| | | | 2 | | | | (19.3) | | 5.77 | 35.1 | | 65.6 | −9.9 |
| | | | 3 | | | 13.3 | 14.0 | 0.20 | 4.44 | 36.6 | 96.4 | 80.0 | 17.5 |

TABLE 4-continued

| Feed | SiCl₄ | Condition Temp °C. | Time hr | Cl₂ Flow cc/min | CO Flow cc/min | Product Weights Sublimate | Product Weights Calcine | Calcine Assay Fe | Calcine Assay Al | Calcine Assay Si | % Volatilization Fe | % Volatilization Al | % Volatilization Si |
|---|---|---|---|---|---|---|---|---|---|---|---|---|---|
| Refuse | No | 650 | 1 | 220 | 100 | | (25.0) | | 6.06 | 31.3 | | 53.2 | −26.0 |
| | | | 2 | | | | (20.1) | | 4.33 | 32.5 | | 73.1 | −5.2 |
| | | | 3 | | | 14.5 | 15.1 | 0.12 | 3.35 | 36.1 | 97.7 | 84.4 | 12.2 |
| Refuse | SiCl₄ 22 cc/min | 650 | 1 | 220 | 100 | | (25.4) | | 5.55 | 32.4 | | 56.5 | −32.5 |
| | | | 2 | | | | (20.8) | | 3.94 | 32.3 | | 74.7 | −8.2 |
| | | | 3 | | | 13.7 | 16.2 | 0.22 | 3.76 | 35.6 | 95.4 | 81.2 | 7.1 |
| Refuse | SiCl₄ 50 cc/min | 650 | 1 | 220 | 100 | | (26.2) | | 6.34 | 35.0 | | 57.4 | −33.5 |
| | | | 2 | | | | (22.3) | | 6.20 | 34.5 | | 64.5 | −12.0 |
| | | | 3 | | | 13.2 | 16.6 | 0.23 | 5.51 | 36.5 | 96.6 | 76.5 | 11.8 |
| Refuse | SiCl₄ 36.3 cc/min | 650 | 1 | 220 | 100 | 11.1 | 18.8 | 0.263 | 7.48 | 34.1 | 95.7 | 63.9 | 6.7 |
| Refuse | SiCl₄ 48.1 cc/min | 650 | 2 | 220 | 100 | 13.7 | 18.8 | 0.156 | 4.23 | 36.2 | 97.4 | 79.6 | 0.9 |
| Bauxite | No | 750 | 1 | 220 | 100 | | (21.8) | | 30.7 | 13.6 | | 4.7 | −36.7 |
| | | | 2 | | | | (13.6) | | 28.8 | 14.7 | | 44.2 | 7.8 |
| | | | 3 | | | 29.0 | 5.4 | 0.60 | 22.3 | 17.9 | 97.6 | 82.8 | 55.5 |
| Bauxite | No | 650 | 1 | 220 | 100 | | (21.3) | | 33.2 | 10.4 | | −0.7 | −2.1 |
| | | | 2 | | | | (12.5) | | 30.8 | 9.92 | | 45.2 | 42.8 |
| | | | 3 | | | 31.2 | 3.8 | 0.67 | 25.4 | 12.6 | 98.1 | 86.3 | 77.9 |
| Bauxite | SiCl 54.1 cc/min | 650 | 1 | 220 | 100 | | (21.9) | | 29.4 | 14.5 | | 8.3 | −46.4 |
| | | | 2 | | | | (13.9) | | 28.8 | 15.8 | | 43.0 | −1.2 |
| | | | 3 | | | 20.7 | 5.8 | 0.65 | 24.3 | 17.7 | 96.4 | 79.9 | 5.27 |

¹Amounts in parentheses were calculated from samples taken during the chlorination process.
²Start with 24 gm feed (charge).

We claim:

1. A process for recovering aluminum from material selected from the group consisting of clays associated with coal and bauxite wherein the material contains aluminum, iron and siliceous materials comprising:
   (a) chlorinating the material in an oxidizing atmosphere containing oxygen in an amount of from about 20 to about 60 percent by volume of the total gas composition at a temperature of about 650° C.−900° C. to selectively vaporize iron as iron chloride;
   (b) chlorinating the residue of step (a) in a reducing atmosphere at a temperature of about 600° C.+850° C. to vaporize the chlorides of aluminum and silicon; and
   (c) separating and recovering the formed chlorides from the vapors by selective condensing.

2. The process of claim 1 wherein the reductive chlorination of step (b) is performed in the presence of carbon monoxide as a reducing agent.

3. The process of claim 1 or claim 2 wherein silicon tetrachloride is added to the residue from step (a) in an amount of from about 3 to about 20 volume percent to suppress the chlorination of the siliceous materials.

4. The process of claim 3 wherein the silicon tetrachloride is mixed with chlorine and used as the chlorinating agent.

5. The process of claim 1 wherein the clay associated with coal contains alkali or alkaline earth minerals and wherein the material from step (b) remaining after vaporization is reacted with sulfuric acid to produce disposable gypsum.

6. The process of claim 5 wherein hydrochloric acid which is formed from the interaction of the sulfuric acid with the material from step (b) is used to prechloridize metals contained in the feed clay prior to its selective chlorination.

7. The process of claim 1 wherein chlorine and oxygen are mixed for the chlorination of step (a).

8. The process of claim 2 wherein the carbon monoxide is introduced at a volume of about 30 to about 70 percent by volume of the total gas composition of step (b).

9. The process of claim 1 wherein titantium is present in the bauxite or clay associated with coal and it is chlorinated in accordance with step (b) and separated and recovered in accordance with step (c).

10. The process of claim 1 wherein when the clay associated with coal is subjected to the selective chlorination, sulfuric acid is added to the residue from the chlorination to precipitate alkaline earth metal sulfates and to form hydrochloric acid and wherein the hydrochloric acid is used to prechloridize metals contained in the feed clay prior to its selective chlorination.

11. A process for recovering aluminum from material selected from the group consisting of clays associated with coal and bauxite wherein the material contains aluminum, iron and siliceous materials comprising:
   (a) chlorinating the material by subjecting it to the action of chlorine at a temperature of from about 650° C. to 900° C. in an oxidizing atmosphere in the presence of added oxygen in an amount of from about 20-60 percent by volume of the total gas composition to selectively vaporize the iron as iron chloride;
   (b) chlorinating the residue of step (a) by subjecting it to the action of chlorine at a temperature of from about 600° C. to 850° C. in a reducing atmosphere of carbon monoxide in an amount of from about 30 to 70 percent by volume of the total gas composition to vaporize the chlorides of aluminum and silicon; and
   (c) separating and recovering the formed chlorides from the vapors by selective condensing.

12. The process of claim 11 wherein the temperature of step (a) is from about 750° to 800° C.

13. The process of claim 11 wherein the temperature of step (b) is from about 650° to 750° C.

14. The process of claim 11 wherein the oxygen of step (a) is added in an amount of from about 30 to 50 percent by volume of the total gas composition of step (a) and the carbon monoxide of step (b) is added in an amount of from about 40 to 60 percent by volume of the total gas composition of step (b).

15. The process of claim 11 or claim 13 wherein silicon tetrachloride is added to the residue of step (a) in an amount of from about 5 to 15 percent by volume of the total gas composition of step (b).

* * * * *